United States Patent Office 2,950,175
Patented Aug. 23, 1960

2,950,175
AQUEOUS HYDROGEN PEROXIDE CONTAINING A SMALL STABILIZING AMOUNT OF NITRILO-TRIACETIC ACID

Peter R. Johnston, Corpus Christi, Tex., assignor to Columbia-Southern Chemical Corporation, Allegheny County, Pa., a corporation of Delaware No Drawing. Filed Apr. 1, 1958, Ser. No. 725,503

2 Claims. (Cl. 23—207.5)

This invention relates to stabilization of aqueous hydrogen peroxide.

It is known that sodium stannate exerts a stabilizing effect upon aqueous hydrogen peroxide solutions. In some chemical reactions, the presence of this material has an adverse effect upon the reaction and/or the character of the product which is obtained. For these reasons, among others, it is advantageous to provide hydrogen peroxide solutions which are stabilized either partially or wholly by organic stabilizers.

The problem of obtaining organic stabilizers is complicated by the fact that hydrogen peroxide reacts with organic compounds. Moreover, many organic compounds not only do not stabilize but actually serve to increase the decomposition rate of hydrogen peroxide.

According to the present invention, it has been found that hydrogen peroxide may be stabilized effectively by adding thereto a small amount of nitrilotriacetic acid. This material has the general formula:

$$N(CH_2COOH)_3$$

The amount of nitrilotriacetic acid which can be used normally ranges from about 0.001 to 1 percent by weight. Normally, the amount used is in excess of about 25 parts by weight per million parts of hydrogen peroxide solution, and the best results usually are achieved when the amount is in the approximate range of 100 to 500 parts of the nitrilotriacetic acid per million parts by weight of hydrogen peroxide solution.

Solutions of any convenient hydrogen peroxide content may be stabilized in this way. However, for most purposes, hydrogen peroxide solutions containing from 10 to 80 percent by weight of $H_2O_2$ are so stabilized. While hydrogen peroxide solutions containing 90 percent or more by weight of $H_2O_2$ may be stabilized using this material, it is rather common to use such hydrogen peroxide solutions without stabilizers.

In a typical series of experiments, pint glass bottles were filled with an aqueous hydrogen peroxide solution containing 50 percent by weight of $H_2O_2$ containing small amounts of carbonaceous impurities produced in the course of generation of the hydrogen peroxide. The hydrogen peroxide used was prepared by the so-called "autoxidation process" involving alternate hydrogenation of 2-ethyl anthraquinone in organic solvent and in the presence of palladium catalyst, followed by oxidation of the resulting quinol and extraction of the aqueous hydrogen peroxide.

To each of the bottles of hydrogen peroxide solution was added 179 milligrams per liter of sodium pyrophosphate ($Na_4P_2O_7.10H_2O$). To three of the bottles was added, respectively, 50, 100, and 250 milligrams of nitrilotriacetic acid per liter of hydrogen peroxide solution. These bottles were then stored at ambient temperatures which ranged from 75 to 95° F. for a period of 3 months. Periodically during this time, the stability of the hydrogen peroxide was measured by heating each of the solutions to 50° C. and measuring the decomposition rate per hour at this temperature. The following table illustrates the results obtained.

Table I

| Material Added | Amount, Milligrams per liter | Decomposition Rate in Percent of Hydrogen Peroxide Decomposed per hour at 50° C. | | | | Average Decomposition, Percent/day During Storage for 3 months |
|---|---|---|---|---|---|---|
| | | After 1 week | After 1 month | After 2 months | After 3 months | |
| Nitrilotriacetic acid | 50 | .0002 | .0007 | .0018 | .0028 | <.0004 |
| Do | 100 | .0002 | .0007 | .0009 | .0025 | .0001 |
| Do | 250 | .0004 | .0009 | .0004 | .0005 | .0003 |

This stability compares favorably with that achieved with sodium stannate. Thus, it appears that nitrilotriacetic acid is as effecive a stabilizer as sodium stannate.

While in the above example sodium pyrophosphate was introduced into the solution, this is not a necessary component and may be omitted if desired. Alternatively, other stabilizers, both inorganic and organic, may be added to the hydrogen peroxide containing the nitrilotriacetic acid, if desired. Moreover, similar results are achieved when hydrogen peroxide of other concentrations is subjected to stabilization.

Although the present invention has been described with reference to the specific details of certain embodiments, it is not intended that such details shall be construed to limit the scope of the invention except insofar as included in the accompanying claims.

What is claimed:

1. Aqueous hydrogen peroxide containing a small stabilizing amount of nitrilotriacetic acid.

2. The aqueous hydrogen peroxide of claim 1 wherein the concentration of nitrilotriacetic acid ranges from 0.001 to 1 percent by weight.

References Cited in the file of this patent

FOREIGN PATENTS 731,238    Great Britain _____ June 1, 1955

OTHER REFERENCES

Martell et al.: "Chemistry of the Metatl Chelate Compounds," 1952, pp. 493–495, 534.